(12) United States Patent
Chang

(10) Patent No.: US 11,615,659 B2
(45) Date of Patent: *Mar. 28, 2023

(54) MOTION SYSTEM HEALTH MANAGEMENT USING MULTIDIMENSIONAL MODELING USING MOTOR OPERATIONAL PARAMETERS

(71) Applicant: ARCUS TECHNOLOGY, INC., Livermore, CA (US)

(72) Inventor: Christopher C. Chang, Pleasanton, CA (US)

(73) Assignee: ARCUS TECHNOLOGY, INC., Livermore, CA (US)

( * ) Notice: Subject to any disclaimer, the term of this patent is extended or adjusted under 35 U.S.C. 154(b) by 81 days.

This patent is subject to a terminal disclaimer.

(21) Appl. No.: 17/190,337

(22) Filed: Mar. 2, 2021

(65) Prior Publication Data

US 2021/0183184 A1 Jun. 17, 2021

Related U.S. Application Data

(63) Continuation-in-part of application No. 16/414,574, filed on May 16, 2019, now Pat. No. 10,935,954.

(60) Provisional application No. 62/672,751, filed on May 17, 2018.

(51) Int. Cl.
| | |
|---|---|
| *G05B 23/00* | (2006.01) |
| *G07C 5/08* | (2006.01) |
| *G06F 17/14* | (2006.01) |
| *B60W 30/18* | (2012.01) |
| *G07C 5/00* | (2006.01) |

(52) U.S. Cl.
CPC ..... *G07C 5/0816* (2013.01); *B60W 30/18109* (2013.01); *G05B 23/00* (2013.01); *G06F 17/142* (2013.01); *G07C 5/008* (2013.01); *G05B 2219/34208* (2013.01)

(58) Field of Classification Search
CPC .......... G07C 5/0816; G07C 5/008; B60W 30/18109; G05B 23/00; G05B 2219/34208; G06F 17/142
USPC ....................................................... 700/13
See application file for complete search history.

(56) References Cited

U.S. PATENT DOCUMENTS

| | | | | |
|---|---|---|---|---|
| 4,535,372 A | * | 8/1985 | Yeakley | G11B 21/085 |
| | | | | 360/77.05 |
| 9,240,083 B2 | * | 1/2016 | Isom | G07C 5/0816 |
| 2008/0165216 A1 | * | 7/2008 | Lee | B41J 29/38 |
| | | | | 318/638 |
| 2008/0169778 A1 | * | 7/2008 | Eguchi | G05B 13/042 |
| | | | | 318/632 |

(Continued)

FOREIGN PATENT DOCUMENTS

| | | | | |
|---|---|---|---|---|
| CN | 103973202 A | * | 8/2014 | ............ G05B 19/19 |
| EP | 3220214 A2 | * | 9/2017 | ........... G05B 13/024 |
| WO | WO-2013158849 A2 | * | 10/2013 | ............ B25J 9/1638 |

*Primary Examiner* — Hien D Khuu

(74) *Attorney, Agent, or Firm* — Loza & Loza, LLP; Thomas H. Ham

(57) ABSTRACT

A motion system and method of managing health of the motion system uses at least one multi-dimensional motor operational parameter (MOP) model and motion variables used by a servo drive of the motion system to calculate at least one health indication value for the motion system. The health indication value is used to generate a notification for maintenance of the motion system.

18 Claims, 9 Drawing Sheets

(56) References Cited

U.S. PATENT DOCUMENTS

| | | | |
|---|---|---|---|
| 2011/0010013 A1* | 1/2011 | Ruan | B25J 5/007 |
| | | | 901/1 |
| 2011/0050146 A1* | 3/2011 | Okita | G05B 19/404 |
| | | | 318/631 |
| 2012/0314844 A1* | 12/2012 | Wiggers | A61N 5/1075 |
| | | | 378/207 |
| 2013/0026963 A1* | 1/2013 | Sonoda | H02P 21/20 |
| | | | 318/561 |
| 2017/0074753 A1* | 3/2017 | Tian | G01M 13/025 |

* cited by examiner

US 11,615,659 B2

MOTION SYSTEM HEALTH MANAGEMENT USING MULTIDIMENSIONAL MODELING USING MOTOR OPERATIONAL PARAMETERS

CROSS REFERENCE TO RELATED APPLICATION

This application is a continuation-in-part application of U.S. patent application Ser. No. 16/414,574, issued as U.S. Pat. No. 10,935,954, which is entitled to the benefit of U.S. Provisional Patent Application Ser. No. 62/672,751, filed on May 17, 2018, which are all incorporated herein by reference.

BACKGROUND OF THE INVENTION

A typical servo motor drive system 100 is illustrated in FIG. 1. As shown in FIG. 1, the servo motor drive system 100 includes a motor 102 with a position sensor 104, such as an encoder, a servo drive 106 that includes a microprocessor and a power circuit (not shown) to drive the motor, and a master controller 108 that issues motion commands to the servo drive. The encoder 104 provides feedback signals to the servo drive 106 to correct for deviations from the expected motion.

The motion commands are issued from the master controller 108 to the servo drive 106 through some communication means, such as a serial or Ethernet connection. Examples of motions commands that can be sent from the master controller 108 to the servo drive 106 include (1) move to a particular position, e.g., Position A, at certain speed and acceleration, and (2) jog at certain speed for certain amount of time and stop.

Typically, the motor of a servo motor drive system is connected to a transmission system that moves a load to perform desired actions. An example of a transmission system 200 connected to the motor 102 of the servo motor drive system 100 is illustrated in FIG. 2. In the illustrated example, the transmission system 200 is a ball screw linear actuator that includes a moving stage 202 on linear guides 204 for a load and a screw 206 that displaces the moving stage. The motor 102 is connected to the servo drive 106 via a motor cable 208 to receive drive signals from the servo drive. The encoder 104 is connected to the servo drive 106 via an encoder cable 210 to transmit feedback signals to the servo drive. The servo drive 106 is in communication with the master controller 108 to receive motion commands from the master controller. The entire system comprising the servo motor drive system and the transmission system can be viewed as a motion system.

In a servo drive of a servo motor drive system, a closed loop servo algorithm is used to perform the desired motions. Theory and implementation of the closed loop servo algorithm are well known, and thus, are not described in detail here. FIG. 3 illustrates the closed loop servo algorithm. As shown in FIG. 3, a reference input 302 and a feedback signal 304 on a feedback loop 306 are received at an error detector 308, which generates an error signal 310 in response to the two inputs. The reference input 302 represents a target or desired position of a controlled device 316 and the feedback signal 304 represents the actual position of the controlled device. The error signal 310 represents the position error between the target position and the actual position. The error signal 310 is received at an amplifier 312, which generates a current to drive a servo motor 314 based on the received error signal to reduce the position error. In response, the servo motor 314 moves the controlled device 316 accordingly.

As a motion system performs the work of moving the load in various cycles, failures eventually occur for various reasons. Examples of failures include (1) bearing being worn out due to load changes, (2) friction increase due to lubricant loss or increase dirt, and (3) linkage breaks due to high impact motions.

SUMMARY OF THE INVENTION

A motion system and method of managing health of the motion system uses at least one multi-dimensional motor operational parameter (MOP) model and motion variables used by a servo drive of the motion system to calculate at least one health indication value for the motion system. The health indication value is used to generate a notification for maintenance of the motion system.

A method of managing health of a motion system with a servo drive in accordance with an embodiment of the invention comprises driving a motor of the motion system using the servo drive to perform a sequence of motions to build a multi-dimensional motor operational parameter (MOP) model; as the motor is being driven, for each motion, collecting a current I that is used to drive the motor, a position P of the motor and a velocity V of the motor together at the same time to produce multiple sets of current I, position P and velocity V values; for each set of current I, position P and velocity V values, computing a corresponding MOP value using at least some of the current I, position P and velocity V values; building the multi-dimensional MOP model for the motion system using the position P, velocity V and corresponding MOP values, the multi-dimensional MOP model being a multi-dimensional model in space defined by at least the position P, velocity V and corresponding MOP values; after the multi-dimensional MOP model has been built, collecting motion variables that are used by the servo drive to drive the motor of the motion system in response to motion commands, the motion variables including an actual current I to drive the motor, an actual position P of the motor and an actual velocity V of the motor; calculating a health indication value for the motion system using the collected motion variables, including computing an actual MOP value using at least some of the actual current I, the actual position P of the motor and the actual velocity V of the motor, and taking a difference between the actual MOP value and a MOP value from the multi-dimensional MOP model to derive a MOP deviation value that is used to calculate the health indication value; and in response to the health indication value, generating a notification for maintenance of the motion system.

A motion system in accordance with an embodiment of the invention comprises a motor, and a servo drive configured to drive the motor. The servo drive includes memory, and at least one processor configured to drive a motor of the motion system using the servo drive to perform a sequence of motions to build a multi-dimensional motor operational parameter (MOP) model; as the motor is being driven, for each motion, collect a current I that is used to drive the motor, a position P of the motor and a velocity V of the motor together at the same time to produce multiple sets of current I, position P and velocity V values; for each set of current I, position P and velocity V values, compute a corresponding MOP value using at least some of the current I, position P and velocity V values; build the multi-dimensional MOP model for the motion system using the position P, velocity V and corresponding MOP values, the multi-dimensional MOP model being a multi-dimensional model in space defined by at least the position P, velocity V and corresponding MOP values; after the multi-dimensional MOP model has been built, collect motion variables that are used by the servo drive to drive the motor of the motion system in response to motion commands, the motion variables including an actual current I to drive the motor, an actual position P of the motor and an actual velocity V of the motor; calculate a health indication value for the motion system using the collected motion variables, including computing an actual MOP value using at least some of the actual current I, the actual position P of the motor and the actual velocity V of the motor, and taking a difference between the actual MOP value and a MOP value from the multi-dimensional MOP model to derive a MOP deviation value that is used to calculate the health indication value; and in response to the health indication value, generate a notification for maintenance of the motion system.

Other aspects and advantages of the present invention will become apparent from the following detailed description, taken in conjunction with the accompanying drawings, illustrated by way of example of the principles of the invention.

DETAILED DESCRIPTION

Figure 1:
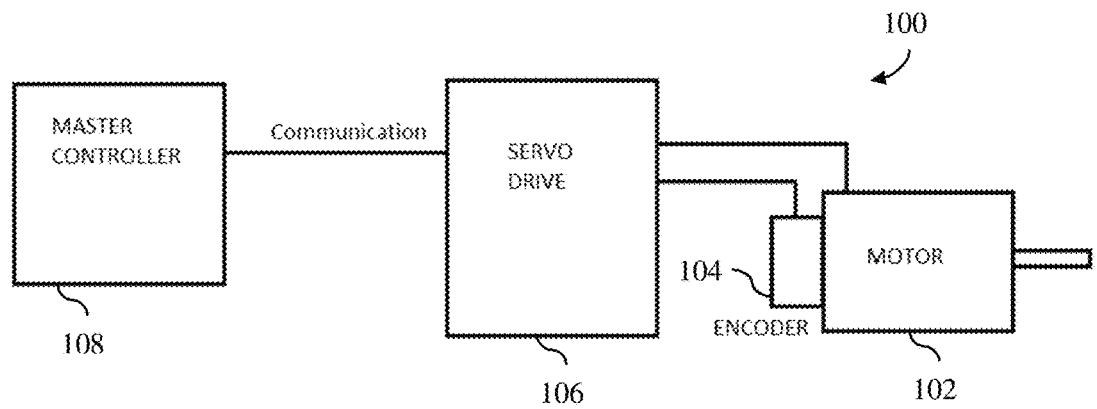
FIG. 1 is a block diagram of a typical servo motor drive system in accordance with the prior art.
Figure 2:
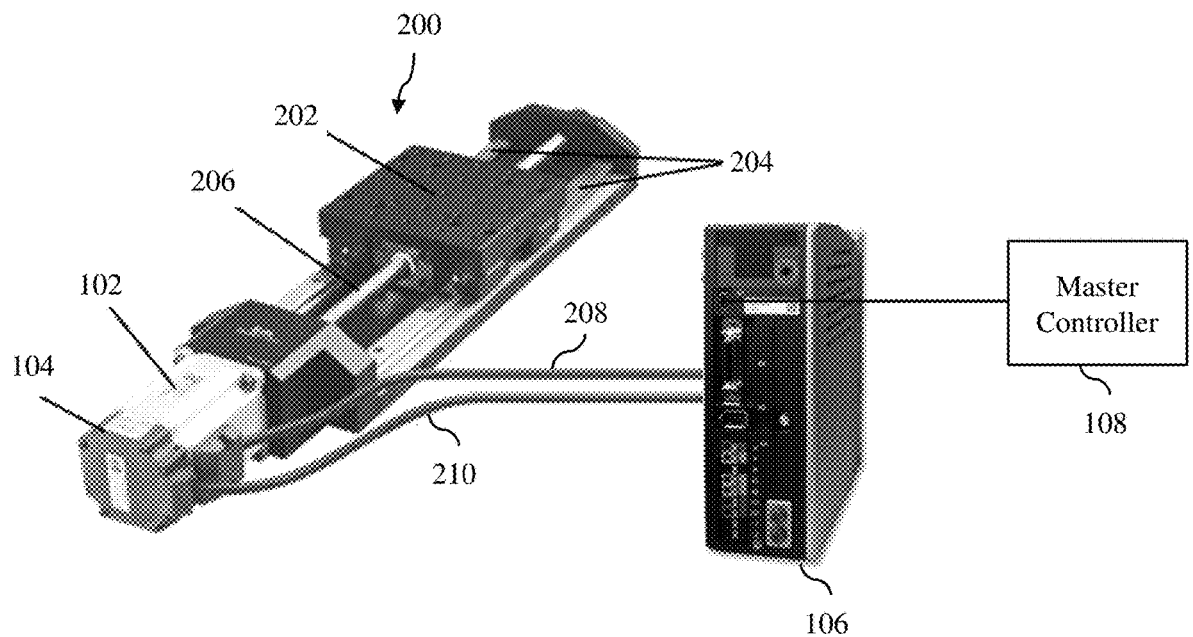
FIG. 2 is a block diagram of a transmission system connected to a motor of the servo motor drive system in accordance with the prior art.
Figure 3:
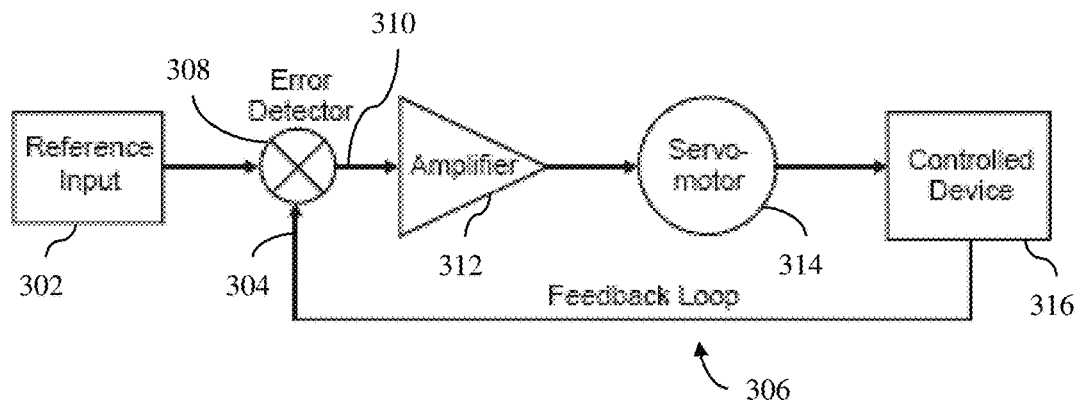
FIG. 3 illustrates the closed loop servo algorithm executed in a servo drive of the servo motor drive system in accordance with the prior art.
Figure 4:
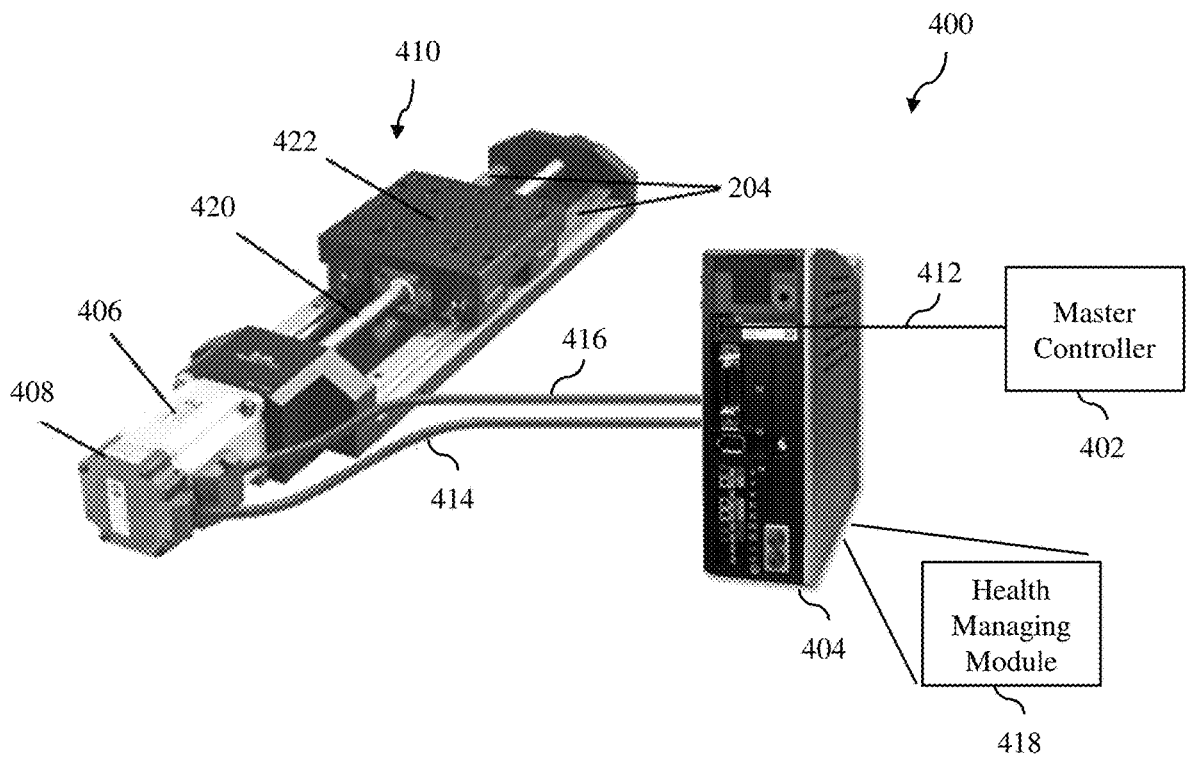
FIG. 4 is a block diagram of a motion system with health management capabilities in accordance with an embodiment of the invention.

With reference to FIG. 4, a motion system 400 with health management capabilities in accordance with an embodiment of the invention is described. The motion system 400 is similar to the motion system shown in FIG. 2. However, unlike a conventional motion system, the motion system 400 implements a method to monitor the comprehensive real-time motion health state of the motion system and to predict various types of mechanical failures in the motion system so that the preventative maintenance can be performed. This method uses motion variables that are commonly used in a closed loop algorithm of a servo drive, and requires no external devices or sensors, as explained in detail below.

As shown in FIG. 4, the motion system 400 includes a master controller 402, a servo drive 404, an electric motor 406 with a position sensor 408, e.g., an encoder, and a transmission system 410 in the form of a ball screw linear actuator. However, in other embodiments, the transmission system 410 can be another type of a motion actuator, such as a linear belt drive actuator.

The master controller 402 operates to control the motion system 400. The master controller 402 may be a computer system with one or more programs to control the motion system via the servo drive 404 using motion commands transmitted to the servo drive. Thus, the master controller 402 may include components commonly found in a computer, such as CPU, memory, nonvolatile storage and input devices, e.g., mouse and keyboard. The master controller 402 communicates with the servo drive 404 through typical communication means, such as a USB, Serial, or Ethernet communication cable 412.

The servo drive 404 controls the electric motor 406 by reading motion data from the encoder 408, which may include position and/or speed, via an encoder cable 414 and supplying appropriate power to the electric motor via a motor cable 416 to drive the electric motor. In order to supply the appropriate power to the motor 406, the servo drive 404 executes a closed loop servo algorithm using the motion command from the master controller 402 and the motion data from the encoder 408. The servo drive 404 includes components commonly found in a typical servo drive, such as memory, a processor, e.g., a microprocessor, and power circuit to supply the driving power or current (not shown).

However, unlike a conventional servo drive, the servo drive 404 includes a health managing module 418 to monitor comprehensive real-time motion health state of the motion system and to predict various types of mechanical failures in the motion system. As explained in detail below, the health managing module 418 operates to compute health indication values to determine the health of the motion system 400 and to determine if maintenance is required for the motion system, such as repair, lube application and replacement of mechanical parts. The health managing module 418 may be implemented in any combination of hardware and software. In a particular implementation, the health managing module 418 may be one or more software executed by the processor of the servo drive 404. The health managing module 418 is described in more detail below.

The motor 406 includes a shaft (not shown), which is connected to a screw 420 of the ball screw linear actuator 410. As the motor shaft is rotated, the screw moves a load attached to a load plate 422 to perform one or more desired motions.

The health managing module 418 in the servo drive 404 is configured to execute the method to monitor the comprehensive real-time motion health state of the motion system and to predict various types of mechanical failures in the motion system. As noted above, this method uses motion variables that are commonly used in a closed loop algorithm of a servo drive. In particular, the method uses variables that are used to drive the motor 406.

The motion variables that are used in the method are derived from two main types variables commonly used in servo drives: (1) P—position and (2) I—current. Note that velocity (V) and acceleration (A) can be derived from the position by known sampling time $\Delta t$, as follows:

$$V=P/\Delta t$$

$$A=V/\Delta t=P/\Delta t^2$$

Using the above mentioned existing variables, which are used in a typical servo drive, the following three motion state parameters can be calculated from the existing servo variables:

1. Friction coefficient values—Coulomb and viscous
2. Position and velocity based torque model
3. Total impact value These three motion state parameters give a good indication of the health of the motion system 400 and allow prediction of the future failures that may occur on the motion system. For example, when a rise of the friction coefficient is detected, it can be determined that the friction is increasing and that there is some wear in the bearing or loss in the lubrication. Also, when there is a deviation from the normal torque model, it can be noted that more torque is required to perform the same work. Increase in the torque deviation may indicate some type of failure or degradation to the system to require increase in the torque to do the same work. As another example, as the total impact value is increasing, there is increase in stress to the mechanical system and may indicate the end of life of linkages or gears or belt.

In an embodiment, the health managing module 418 is configured to calculate friction coefficient values. The friction coefficient value calculation is based on the following well-known equation in the field of motion control:

$$T=J*A+B*w+C*(dw), \quad \text{(Equation 1)}$$

where T is the torque, J is the inertia, A is the acceleration, B is the viscous friction coefficient, w is the velocity, C is the Coulomb friction coefficient, and dw is the direction of velocity.

In the above equation, the torque is equal to current multiplied by the torque constant as:

$$T=Kt*I,$$

where T is the torque, Kt is the torque constant and I is the drive current. Thus, Equation 1 can be expressed as:

$$Kt*I=J*A+B*w+C*(dw) \quad \text{(Equation 2)}$$

Acceleration is the change in speed over delta time or change in time. Speed is the change in position over delta time. Thus, speed (velocity) and acceleration and can be expressed as follows:

$$V=P/\Delta t$$

$$A=V/\Delta t=P/\Delta t^2$$

Thus, Equation 2 can be expressed as:

$$Kt*I=J*(P/\Delta t^2)+B*P/\Delta t+C*(dw) \quad \text{(Equation 3)}$$

In Equation 3, the motor inertia J is known. Thus, two unknown values are C (Coulomb friction value) and B (viscous coefficient value). All other variables in the equation are known: Kt, I, P, J, $\Delta t$, and dw. By taking many sample values and using a regression analysis, the viscous and Coulomb friction coefficient values B and C can be determined. The viscous and Coulomb friction coefficient values B and C are health indication values for the motion system 400.

The health managing module 418 also generates a three-dimensional (3D) torque model. By collecting sets of position, velocity and current values, a 3D torque model can be generated. The health managing module 418 repeatedly collects position, velocity and current values at the same moment, which are produced as the motion system is operated. Using these values, a good performance model with respect to torque for the motion system can be built. In an embodiment, for each 3D point (position, velocity and torque), maximum, minimum and average values can be determined. These values can be used to make a maximum and minimum extreme model for the torque values or make an average point model for the torque values using the average values.

Figure 5:
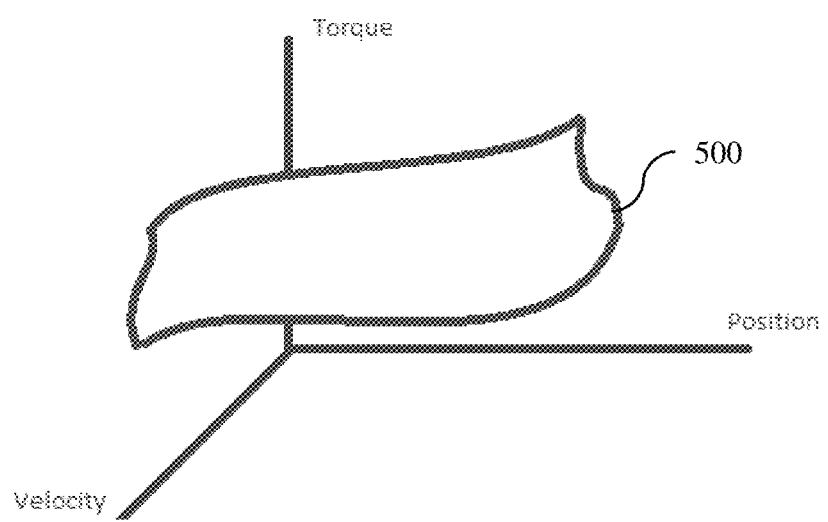
FIG. 5 illustrates a three-dimensional torque model used by the motion system in accordance with an embodiment of the invention.

An example of a 3D torque model 500 is illustrated in FIG. 5. As shown in FIG. 5, the 3D torque model 500 is generated using position, velocity and current values that have been collected over a period of time when the motion system was in operation. As shown in FIG. 5, the 3D torque model 500 is a 3D model in a space defined by velocity, position and torque.

Once the 3D torque model is built, the real-time torque can be compared against the model, using minimum, maximum and/or average torque values in the model. Torque deviation values are determined at each given position and velocity points. Each torque deviation value represents the difference in the amount of force that is required to perform the same type of work at the given position and velocity point. Thus, the torque deviation value is another health indication value for the motion system 400.

Figure 6:
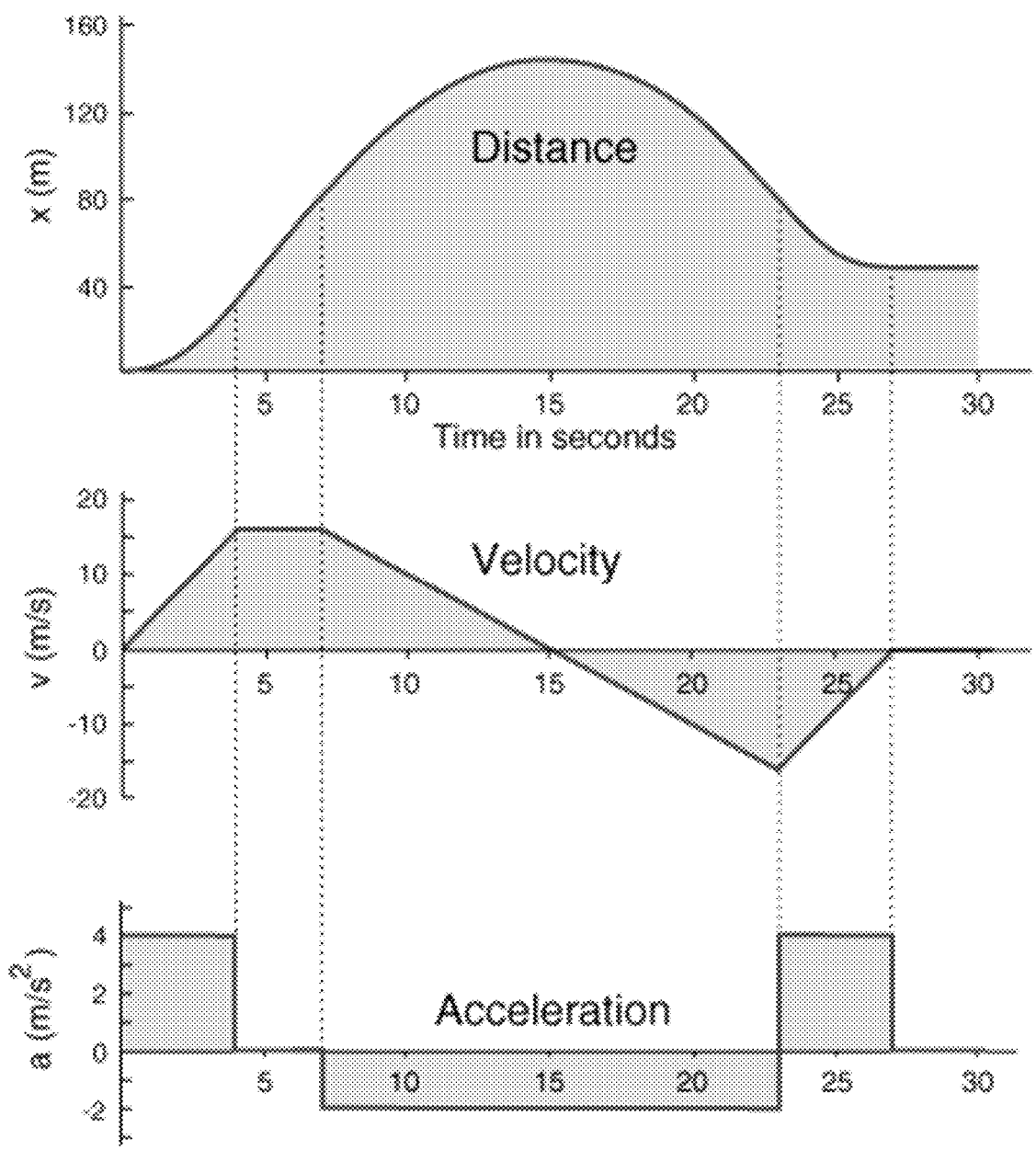
FIG. 6 illustrates distance, velocity and acceleration profiles of a motion system in accordance with an embodiment of the invention.

The health managing module 418 also calculates a total impact value. Typical motion profiles for a motion system are shown in FIG. 6, which depicts the distance, velocity and acceleration profiles. The following is the force (or torque in angular) equation in relation to the acceleration:

$$F=M*A,$$

where F is the force, M is the mass and A is the acceleration.

Impact is defined as the change in the force that is applied to the system and can be represented by the following equation:

$$\Delta F=M*\Delta A$$

The above equation defines that the change in the force is proportional to the change in the acceleration.

Figure 7:
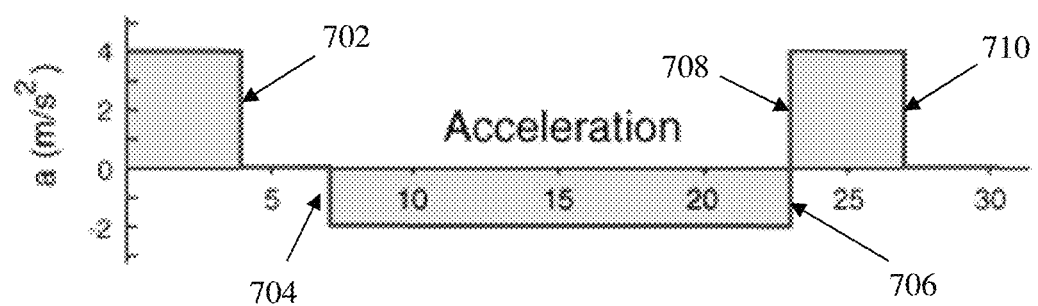
FIG. 7 illustrates an example of an acceleration graph, which can be used to calculate the total amount of impact, in accordance with an embodiment of the invention.

By determining the magnitude in the change of acceleration, the amount of impact can be determined. An example of an acceleration graph is illustrated in FIG. 7, which can be used to calculate the total amount of impact. The acceleration graph shows five instances 702, 704, 706, 708 and 710 of acceleration change. In the first instance 702, the acceleration has changed by four (4) from four (4) to zero (0). In the second instance 704, the acceleration has changed by two (2) from zero (0) to negative two (−2). In the third instance 706, the acceleration has changed by two (2) from negative two (−2) to zero (0). In the fourth instance 708, the acceleration has changed by four (4) from zero (0) to four (4). In the fifth instance 710, the acceleration has changed by four (4) from four (4) to zero (0). Thus, the total amount of impact is calculated as:

$$\text{Total Impact}=J*(4+2+2+4+4),$$

where J is inertia (angular replacement for M).

The total impact values are summed over the life of the motion system 400 and determined as the total amount of stress and strain and wear that has been applied to the motion system. Thus, the accumulated total impact value can be used to determine the remaining life on the mechanical system and can be used to determine replacement or maintenance schedule for the motion system. As such, the total impact value is another health indication value for the motion system 400.

Figure 8:
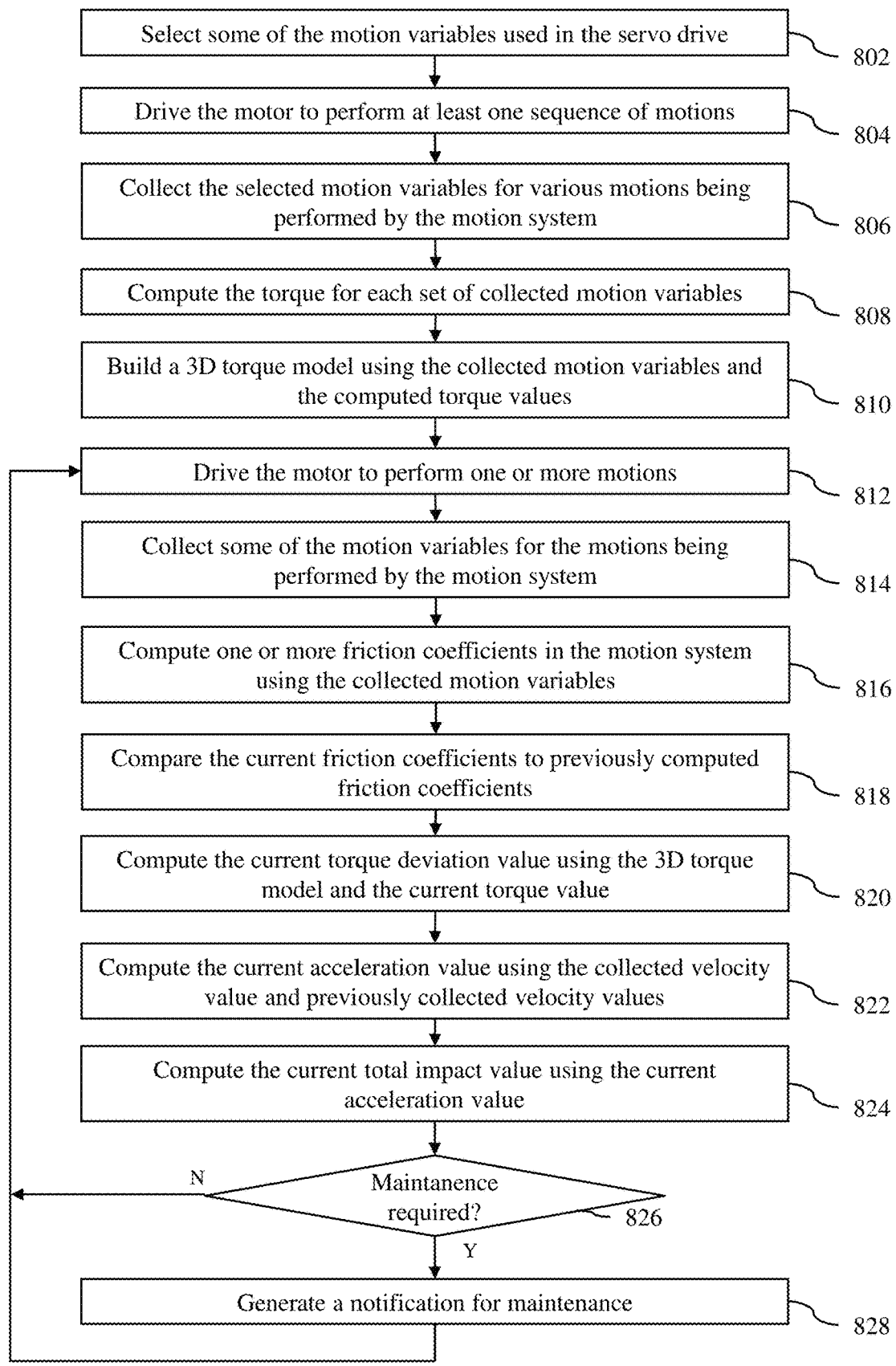
FIG. 8 is a flow diagram of the operation of the motion system with health management capabilities in accordance with an embodiment of the invention.

The operation of the motion system 400 with health management capabilities in accordance with an embodiment of the invention is described with reference to a process flow diagram of FIG. 8. At block 802, some of the motion variables used in the servo drive 404 to drive the motor 406 are selected by the health management module 418 to build a 3D torque model for the motion system 400. In an embodiment, these motion variables may include, but not limited to, the current I used to drive the motor 406 and the actual position P and velocity V of the motor 406 at a particular moment of time. The actual position P and velocity V are provided by the encoder 408 attached to the motor 406. If velocity V is not provided by the encoder 408, the velocity V may be calculated from multiple position P values over a period of time.

Next, at block 804, the motor 406 is driven to perform at least one sequence of motions to build the 3D torque model by supplying appropriate current I to the motor. The sequence of motions may include one or more motions that are to be executed via the motor 406 to move the load plate 422 of the ball screw linear actuator 410.

Next, at block 806, as the motor 406 is being driven, the selected motion variables are collected at the same moment of time by the health management module 418 for various motions being performed by the motion system 400. In the embodiment where the current I, position P and velocity V are selected, the current I and the resulting position P and velocity V are collected together at the same time for each motion.

Next, at block 808, the corresponding torque is computed for each set of collected motion variables by the health management module 418. In particular, each torque value is computed using the equation $T=K_t*I$, where T is the torque, $K_t$ is the torque constant and I is the driving current.

Next, at block 810, a 3D torque model for the motion system 400 is built by the health management module 418 using the collected motion variables and the computed torque values. In an embodiment, the 3D torque model is built using the position P and velocity V values and the corresponding torque values. The 3D torque model is now ready to be used in real time to detect the health of the motion system.

Next, at block 812, the motor is driven to perform one or more motions for normal operations. The motor is driven by supplying appropriate current I from the servo drive 404 to the electric motor in response to one or motion commands from the master controller 402 of the motion system 400.

Next, at block 814, as the motor 406 is being driven, some of the motion variables used in the servo drive 404 to drive the motor are collected by the health management module 418. In an embodiment, these motion variables may again include the current I used to drive the motor 406 and the actual position P and velocity V of the motor at a particular moment of time. If velocity V is not provided by the encoder 408, the velocity V may be calculated from multiple position P values over a period of time.

Next, at block 816, one or more friction coefficients in the motion system 400 are computed using the collected motion variables by the health management module 418. In an embodiment, the Coulomb friction coefficient value C and the viscous coefficient value B are computed. These friction coefficient values can be computed using Equation 3, i.e., $K_t*I=J*(P/\Delta t^2)+B*P/\Delta t+C*(dw)$, since all the variables, except for the Coulomb friction value C and the viscous coefficient value B, are either known or can be derived from known values.

Next, at block 818, the current friction coefficients are compared to previously computed friction coefficients by the health management module 418 to determine the trend of the friction coefficients, e.g., whether the friction coefficients are increasing, decreasing or remaining approximately at the same level. As previously noted, an increase in the friction coefficient values can indicate some wear in the bearing or loss in the lubrication, which may require replacement, repair or lubrication.

Next, at block 820, the current torque deviation value is computed by the health management module 418 using the 3D torque model and the current torque value. The torque deviation value is computed by taking the difference between the torque value (minimum, maximum or average) from the 3D torque model for the current actual position P and velocity V and the current torque value computed using the corresponding driving current I.

Next, at block 822, the current acceleration value A is computed by the health management module 418 using the collected velocity value V and the previously collected velocity values. Thus, the change in acceleration can be computed over time.

Next, at block 824, the current total impact value is computed by the health management module 418 using the current acceleration value. If the current acceleration value A is same as the previous acceleration value, then the current total impact value will be same as the previous total impact value. However, if the current acceleration value A is not the same as the previous acceleration value, the magnitude of the difference is added to the previous total impact value to derive the current total impact value. Thus, the total impact value is an accumulating value.

Next, at block 826, a determination is made by the health management module 418 whether one or more of the computed friction coefficients, the current torque deviation value and the current total impact value indicate that a maintenance is required. If no, then the operation proceeds back to block 812. However, if yes, then the operation proceeds to block 828, where a notification is generated to indicate that maintenance is required. The notification may include, but not limited to, a need for repair, replacement or lubrication of mechanical components in the motor system 400. The notification may be presented to a user in any means, such as displayed on a display device connected to the master controller 402. Next, the operation proceeds back to block 812 to further monitor the health of the motor system.

The determination of whether a maintenance of the motion system 400 is required may be made by comparing the computed friction coefficients, the current torque deviation value and the current total impact value to threshold values, which may be empirically or theoretically determined. In an embodiment, certain types of failures may be predicted by testing various scenario cases. For example, a scenario case can be built where there is loss of lubrication, which requires maintenance. To build this case, the lubrication can be manually force out and observe the pattern of friction coefficients and torque model changing as the motion system is operated. Once the case is built, the monitored values can be compared to the observed values to determine when the lubrication is low and requires service. The cases that can be built include, but not limited to, low lubricant, belt or gear wearing out, assembly loosening, etc. These cases can be built and used to determine the type of failures that can be predicted on the motion system 400.

As noted above, the monitoring of the motion variables and various calculations for health indication values are executed by the health management module 418 in the servo drive 404. Thus, there is no need to send raw data to the master controller 402 or elsewhere, such as the cloud, which may result in delays and overwhelmed data traffic.

In an embodiment, the method described above can be used not only to determine the health of a single motor system, but to determine the health of a group of motion systems, even at a plant level. Thus, the method can be used to monitor the health state and the health trends of an individual motion system and/or a group of motion systems.

In another embodiment, the method described above may be used with techniques described in the U.S. patent application Ser. No. 15/865,088, titled "MULTI-DIMENSIONAL MOTION PERFORMANCE MODELING AND REAL-TIME MONITORING OF A MOTION SYSTEM," which is incorporated herein by reference.

In the embodiments described above, a 3D torque model was used to determine the health of a motor system. In order to generate the 3D torque model, a torque value was determined at each position and velocity point of the motor system in operation. The equation below represents the 3D torque model as a function of motor position and velocity:

$$\text{Torque}=f(\text{position},\text{velocity})$$

In other embodiments, different 3D models may be used to determine, the health of a motor system by measuring a motor vibration value, a motor current noise value, and/or a motor friction value at each motor position and motor velocity point of the motor system in operation. Specifically, a vibration 3D model, a current noise 3D model and/or a friction 3D model may be used in various embodiments of the invention with or without a torque 3D model.

Vibration 3D Model

Figure 9:
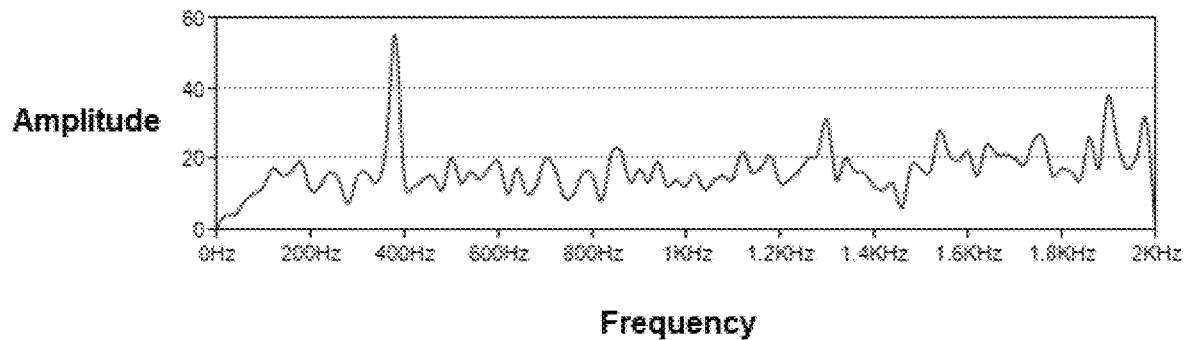
FIG. 9 is an example of an FFT (fast-Fourier transform) generated vibration graph represented by motor velocity frequency and amplitude in accordance with an embodiment of the invention.

For the vibration 3D model, at each point in the position/velocity plane (i.e., a plane defined by position and velocity values of the motor 102), motor velocity values are collected, and fed through a FFT (fast-Fourier transform) analysis to generate frequency and amplitude values of the velocity values. From the velocity frequency and amplitude values, the mechanical vibration values of the motor 102 can be estimated. Example of FFT generated vibration graph represented by velocity frequency and amplitude is shown in FIG. 9.

From the velocity frequency and amplitude graph, an analysis can be performed to determine the following values: (1) maximum amplitude of the velocity, (2) frequency of maximum velocity amplitude, (3) velocity average, and (4) standard deviation of velocity values. Using any of these values or any combination of values derived from the frequency and amplitude graph, a vibration 3D model of the motor 102 can be generated, which is represented by the following equation:

$$\text{Vibration}=f(\text{position},\text{velocity}).$$

Current Noise 3D Model

Figure 10:
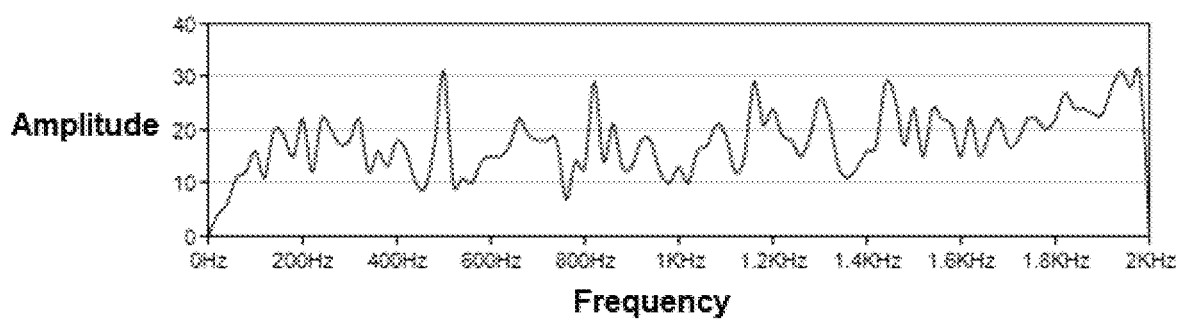
FIG. 10 is an example of an FFT generated current graph represented by motor current frequency and amplitude in accordance with an embodiment of the invention.

For the current noise 3D model, at each point in the position/velocity plane, motor current values are collected, and fed through the FFT analysis to generate frequency and amplitude values of the motor current. From the frequency and amplitude values of the motor current, the motor current noise can be estimated. The motor current noise can also translate into an audible noise, depending on the amplitude and frequency of the current noise. Example of FFT generated graph represented by current frequency and amplitude is shown in FIG. 10.

Similar to the vibration analysis, from the current frequency and amplitude graph, an analysis can be performed to determine the following values: (1) maximum amplitude of current, (2) frequency of maximum current amplitude, (3) current average, and (4) standard deviation of current values. Using any of these values or any combination of values derived from the frequency and amplitude graph, a current noise 3D model can be generated, which is represented by the following equation:

$$\text{Current Noise}=f(\text{position},\text{velocity}).$$

Friction 3D Model

For the friction 3D model, at each point in the position/velocity plane, motor friction values can be calculated using the following well-known mechanical dynamic equation (i.e., Equation 1):

$$T=J*A+B*w+C*(dw),$$

where T is the motor torque, J is the inertia, A is the acceleration, w is the velocity, B is viscous friction coefficient value, the C is the coulomb friction value, and dw is the direction of the motion.

At each position and velocity range point, a group of data points are collected, and the friction coefficient values (B and C) are determined using a curve fitting regression technique. That is, once the position and velocity ranges are obtained, the position and velocity ranges can be broken down into grid sections. For example, the position range from 0 to 100 can be broken down into the following five (5) sections: 0-19, 20-39, 40-59, 60-79 and 80-100. The same can be done for the velocity range. Once these sections are determined, the current, FFT values, friction values for each section can be measured. As an example, if the number of position sections is five (5), and the number of velocity sections is four (4), there can be a total of twenty (20) square sections. From each section, values can be gathered and the current, FFT, friction values can be determined.

In addition to position and velocity, inertia can be added as another variable. For example, if there are three (3) inertia values and the number of position and velocity sections are five (5) and four (4), respectively, then there will be 5×4×3 cubes (instead of 5×4 square sections). For each cube, values can be collected and the current, FFT, friction values can be determined.

At each position and velocity point on the plane, friction coefficient value (B or C) are plotted to generate a friction 3D Model, which is represented by the following equation:

$$\text{Friction}=f(\text{position},\text{velocity}).$$

4D Models with Inertia

As described above, using position and velocity values, the following 3D models can be generated as a function of position and velocity:

$$\text{Torque}=f(\text{position},\text{velocity})$$

$$\text{Vibration}=f(\text{position},\text{velocity})$$

$$\text{Current Noise}=f(\text{position},\text{velocity})$$

$$\text{Friction}=f(\text{position},\text{velocity})$$

In some embodiments, using motion system inertia values in addition to motor position and velocity values, 4D models can be generated. Following are 4D models that can be generated using the motion system inertia values in addition to the position and velocity values:

Torque=*f*(position,velocity,inertia)

Vibration=*f*(position,velocity,inertia)

Current Noise=*f*(position,velocity,inertia)

Friction=*f*(position,velocity,inertia)

In an embodiment, inertia values can be estimated by using the same equation (i.e., T=J*A+B*w+C*(dw)) and regression technique that were used in estimating the friction values. Alternatively, inertia values can be inputted by the user, i.e., the inertia values can be entered into the system by the user.

6D Models

For a coupled motion system, such as an articulated robot arm or Selective Compliance Assembly (or Articulated) Robot Arm (SCARA) motion system, the XYZ cartesian position values can be used instead of a single motor position value. Thus, similar torque, vibration, current (or electrical) noise and friction values as function of cartesian XYZ position values, motor velocity, and motion system inertia value can be generated as follows:

Torque=*f*(X position,Y position,Z position,motor velocity,inertia)

Vibration=*f*(X position,Y position,Z position,motor velocity,inertia)

Current Noise=*f*(X position,Y position,Z position, motor velocity,inertia)

Friction=*f*(X position,Y position,Z position,motor velocity,inertia)

In the above equations, there are three cartesian XYZ position values, motor velocity value, and inertia value, with the inertia value as a function of the other coupled motor position values. Using these equations, one or more 6D models can be generated with respect to torque, vibration, current noise and/or friction. 5D models may also be generated by not including the inertia values.

These multidimensional models with respect to motor operational parameters, such as torque, vibration, current noise and friction, which can be used to monitor the health of a motion system, are generated by the health managing module 418 running in the servo drive 404. Thus, calculations and analyses needed to generate the multidimensional motor operational parameter (MOP) models are performed by the health managing module 418. However, in other embodiments, the multidimensional MOP models may be generated by other software applications running in the servo drive 404 or in any computer system.

After one or more multidimensional MOP models are generated, the models are used to determine the current health status of the motion system 400 in a similar manner as described above with respect to the torque 3D model. In some embodiments, multiple multidimensional models of different motor operational parameters may be used to determine the current health status of the motion system 400.

Figure 11:
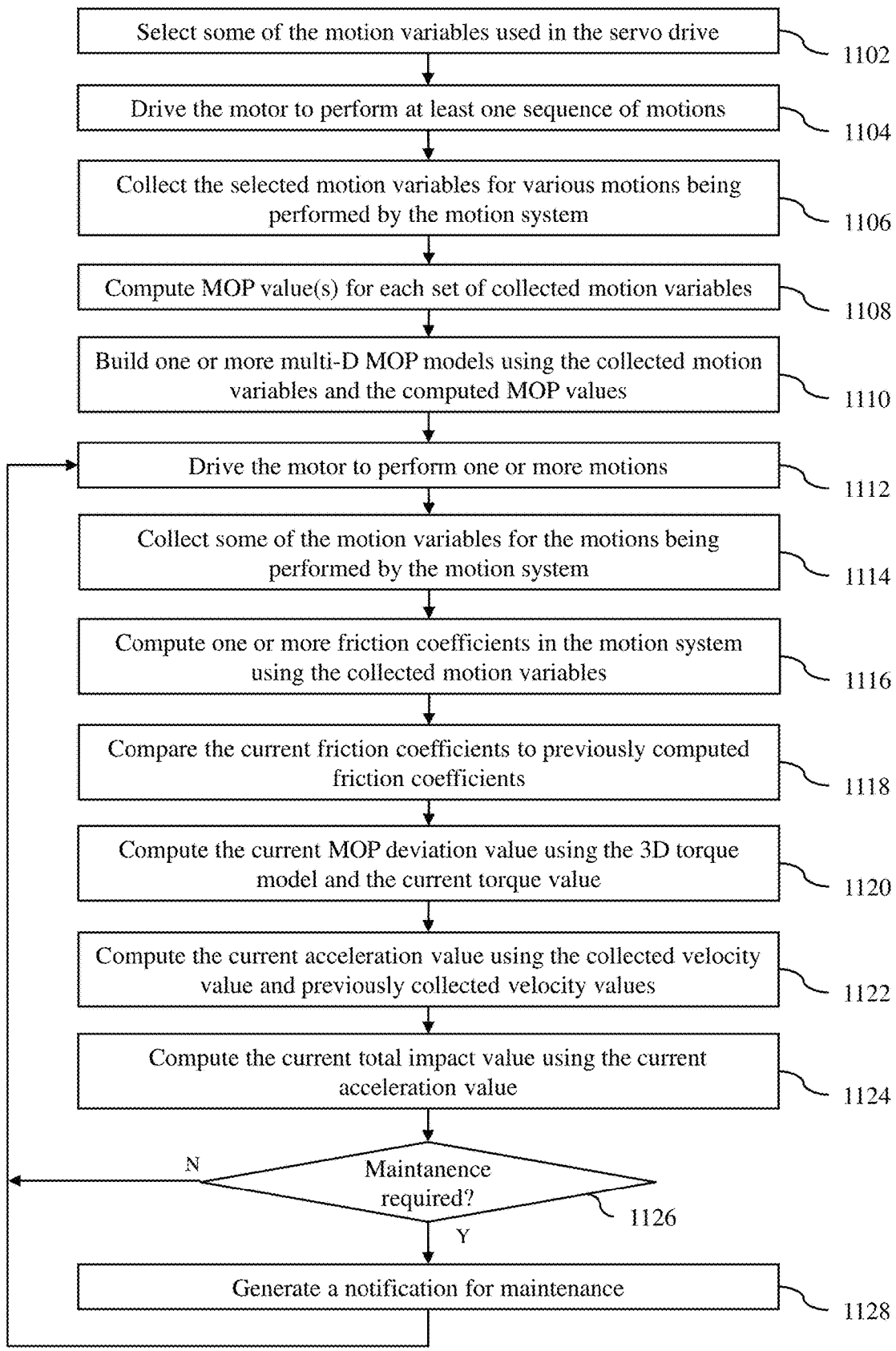
FIG. 11 is a flow diagram of the operation of the motion system with health management capabilities in accordance with an embodiment of the invention.

The operation of the motion system 400 with health management capabilities in accordance with other embodiments of the invention is described with reference to a process flow diagram of FIG. 11. At block 1102, some of the motion variables used in the servo drive 404 to drive the motor 406 are selected by the health management module 418 to build one or more multidimensional MOP models for the motion system 400. In an embodiment, these motion variables may include, but not limited to, the current I used to drive the motor 406 and the actual position P and velocity V of the motor 406 at a particular moment of time. The actual position P and velocity V are provided by the encoder 408 attached to the motor 406. If velocity V is not provided by the encoder 408, the velocity V may be calculated from multiple position P values over a period of time.

Next, at block 1104, the motor 406 is driven to perform at least one sequence of motions to build one or more multidimensional MOP models by supplying appropriate current I to the motor. The multi-dimensional MOP models may include torque, vibration, current noise and friction models, which may be 3D, 4D or 6D models. The sequence of motions may include one or more motions that are to be executed via the motor 406 to move the load plate 422 of the ball screw linear actuator 410.

Next, at block 1106, as the motor 406 is being driven, the selected motion variables are collected at the same moment of time by the health management module 418 for various motions being performed by the motion system 400. In the embodiment where the current I, position P and velocity V are selected, the current I and the resulting position P and velocity V are collected together at the same time for each motion.

Next, at block 1108, the corresponding MOP value for each of the multidimensional MOP models being built is computed for each set of collected motion variables by the health management module 418. Depending on the multi-dimensional MOP models being used, the MOP value may be a torque, vibration, current noise or friction value.

Next, at block 1110, one or more multidimensional MOP models for the motion system 400 are built by the health management module 418 using the collected motion variables and the computed MOP values. The generated multidimensional MOP models are now ready to be used in real time to detect the health of the motion system.

Next, at block 1112, the motor is driven to perform one or more motions for normal operations. The motor is driven by supplying appropriate current I from the servo drive 404 to the electric motor in response to one or motion commands from the master controller 402 of the motion system 400.

Next, at block 1114, as the motor 406 is being driven, some of the motion variables used in the servo drive 404 to drive the motor are collected by the health management module 418. In an embodiment, these motion variables may again include the current I used to drive the motor 406 and the actual position P and velocity V of the motor at a particular moment of time. If velocity V is not provided by the encoder 408, the velocity V may be calculated from multiple position P values over a period of time.

Next, at block 1116, one or more friction coefficients in the motion system 400 are computed using the collected motion variables by the health management module 418. In an embodiment, the Coulomb friction coefficient value C and the viscous coefficient value B are computed. These friction coefficient values can be computed using Equation 3, i.e., Kt*I=J*(P/Δt^2)+B*P/Δt+C*(dw), since all the variables, except for the Coulomb friction value C and the viscous coefficient value B, are either known or can be derived from known values.

Next, at block 1118, the current friction coefficients are compared to previously computed friction coefficients by the health management module 418 to determine the trend of the friction coefficients, e.g., whether the friction coefficients are increasing, decreasing or remaining approximately at the same level. As previously noted, an increase in the friction coefficient values can indicate some wear in the bearing or loss in the lubrication, which may require replacement, repair or lubrication.

Next, at block 1120, the current MOP deviation value for each multidimensional MOP model is computed by the health management module 418 using the corresponding multidimensional MOP model and the current MOP operational value for that multidimensional MOP model. As an example, a vibration deviation value is computed by taking the difference between the vibration value (minimum, maximum or average) from the vibration model for the current actual position P and velocity V and the current vibration value computed using the current actual position P and velocity V. Torque, current noise and friction deviation values can be computed in a similar manner using the appropriate multidimensional MOP models. Thus, values of the multidimensional MOP models are used as baseline values, which are compared with corresponding values computed as the motion system 400 continues to operate to find out how much the values are changing, which indicate health changes in the system.

Next, at block 1122, the current acceleration value A is computed by the health management module 418 using the collected velocity value V and the previously collected velocity values. Thus, the change in acceleration can be computed over time.

Next, at block 1124, the current total impact value is computed by the health management module 418 using the current acceleration value. If the current acceleration value A is same as the previous acceleration value, then the current total impact value will be same as the previous total impact value. However, if the current acceleration value A is not the same as the previous acceleration value, the magnitude of the difference is added to the previous total impact value to derive the current total impact value. Thus, the total impact value is an accumulating value.

Next, at block 1126, a determination is made by the health management module 418 whether one or more of the computed friction coefficients, one or more current MOP deviation values and the current total impact value indicate that a maintenance is required. The computed friction coefficients, the current MOP deviation values and the current total impact value are referred to herein as health indication values since these values are associated with the current health of the motion system 400. If maintenance is not required, then the operation proceeds back to block 1112. However, if maintenance is required, then the operation proceeds to block 1128, where a notification is generated to indicate that maintenance is required. The notification may include, but not limited to, a need for repair, replacement or lubrication of mechanical components in the motor system 400. The notification may be presented to a user in any means, such as displayed on a display device connected to the master controller 402. Next, the operation proceeds back to block 1112 to further monitor the health of the motor system.

Figure 12:
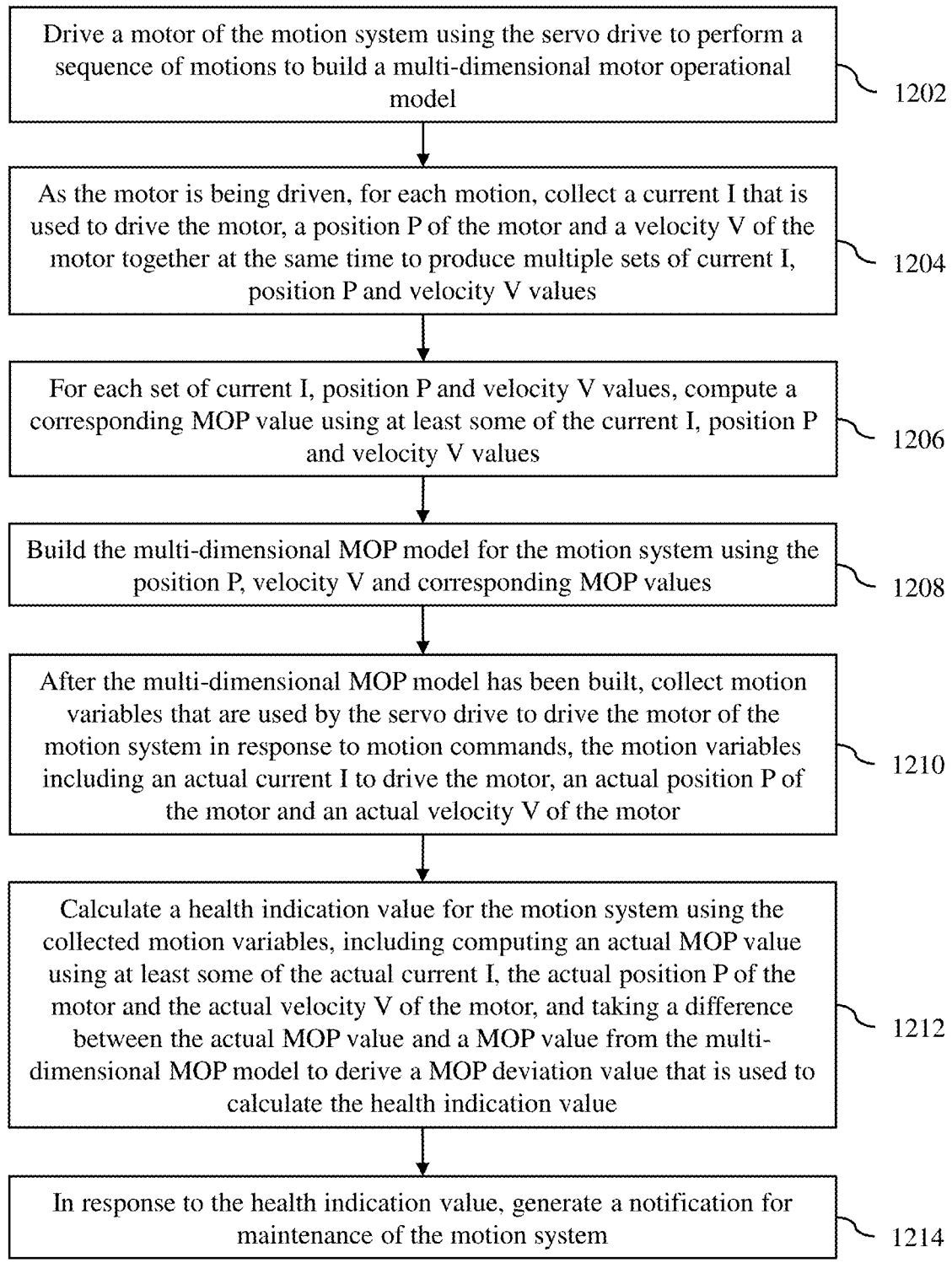
FIG. 12 is a process flow diagram of a method of managing health of a motion system with a servo drive in accordance with an embodiment of the invention.

A method of managing health of a motion system with a servo drive in accordance with an embodiment of the invention is described with reference to a process flow diagram of FIG. 12. At block 1202, a motor of the motion system is driven using the servo drive to perform a sequence of motions to build a multi-dimensional MOP model. At block 1204, as the motor is being driven, for each motion, a current I that is used to drive the motor, a position P of the motor and a velocity V of the motor are collected together at the same time to produce multiple sets of current I, position P and velocity V values. At block 1206, for each set of current I, position P and velocity V values, a corresponding MOP value is computed using at least some of the current I, position P and velocity V values. At block 1208, the multi-dimensional motor operational model for the motion system is built using the position P, velocity V and corresponding motor operational values, the multi-dimensional motor operational model being a multi-dimensional model in space defined by at least the position P, velocity V and corresponding motor operational values. At block 1210, after the multi-dimensional motor operational model has been built, collecting motion variables that are used by the servo drive to drive the motor of the motion system in response to motion commands. The motion variables include an actual current I to drive the motor, an actual position P of the motor and an actual velocity V of the motor. At block 1212, a health indication value for the motion system is calculated using the collected motion variables, including computing an actual motor operational value using at least some of the actual current I, the actual position P of the motor and the actual velocity V of the motor, and taking a difference between the actual motor operational value and a motor operational value from the multi-dimensional motor operational model to derive a motor operational deviation value that is used to calculate the health indication value. At block 1214, in response to the health indication value, a notification for maintenance of the motion system is generated.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method of managing health of a motion system with a servo drive, the method comprising:
    driving a motor of the motion system using the servo drive to perform a sequence of motions to build a multi-dimensional motor operational parameter (MOP) model;
    as the motor is being driven, for each motion, collecting a current I that is used to drive the motor, a position P of the motor and a velocity V of the motor together at the same time to produce multiple sets of current I, position P and velocity V values;
    for each set of current I, position P and velocity V values, computing a corresponding MOP value using at least some of the current I, position P and velocity V values;
    building the multi-dimensional MOP model for the motion system using the position P, velocity V and corresponding MOP values, the multi-dimensional MOP model being a multi-dimensional model in space defined by at least the position P, velocity V and corresponding MOP values;
    after the multi-dimensional MOP model has been built, collecting motion variables that are used by the servo drive to drive the motor of the motion system in response to motion commands, the motion variables including an actual current I to drive the motor, an actual position P of the motor and an actual velocity V of the motor;
    calculating a health indication value for the motion system using the collected motion variables, including computing an actual MOP value using at least some of the actual current I, the actual position P of the motor and the actual velocity V of the motor, and taking a difference between the actual MOP value and a MOP value from the multi-dimensional MOP model to derive a MOP deviation value that is used to calculate the health indication value; and
    in response to the health indication value, generating a notification for maintenance of the motion system.

2. The method of claim 1, wherein building the multi-dimensional MOP model for the motion system includes building a three-dimensional MOP model for the motion system using the position P, velocity V and corresponding MOP values, the corresponding MOP values including torque, vibration, current noise or friction values associated with the motion system, each of these corresponding MOP values being a function of the position P and velocity V values.

3. The method of claim 1, wherein building the multi-dimensional MOP model for the motion system includes building a four-dimensional MOP model for the motion system using motion system inertia values in addition to the position P, velocity V and corresponding MOP values, the corresponding MOP values including torque, vibration, current noise or friction values associated with the motion system, each of these corresponding MOP values being a function of the position P, velocity V and motion system inertia values.

4. The method of claim 1, wherein the position P value is defined by X position, Y position and Z position values, and wherein building the multi-dimensional MOP model for the motion system includes using the X position, Y position and Z position values to generate the multi-dimensional MOP model.

5. The method of claim 4, wherein building the multi-dimensional MOP model for the motion system includes building a six-dimensional MOP model for the motion system using motion system inertia values in addition to the X position, Y position, Z position, velocity V and corresponding MOP values, the corresponding MOP values including torque, vibration, current noise or friction values associated with the motion system, each of these corresponding MOP values being a function of the X position, Y position, Z position, velocity V and motion system inertia values.

6. The method of claim 1, wherein computing the corresponding MOP value includes using fast-Fourier transform analysis on the current I values or the velocity V values to derive the corresponding MOP value.

7. The method of claim 1, further comprising calculating another health indication value, wherein the another health indication value is a friction coefficient value that is computed using only the collected motion variables used by the servo drive.

8. The method of claim 7, wherein the friction coefficient value is a viscous friction coefficient value or a Coulomb friction coefficient value.

9. The method of claim 1, further comprising calculating another health indication value, wherein the another health indication value is a total impact value that is computed using magnitudes of changes in acceleration based on the collected motion variables.

10. A motion system comprising:
a motor, and
a servo drive configured to drive the motor, the servo drive including,
memory; and
at least one processor configured to:
drive a motor of the motion system using the servo drive to perform a sequence of motions to build a multi-dimensional motor operational parameter (MOP) model;
as the motor is being driven, for each motion, collect a current I that is used to drive the motor, a position P of the motor and a velocity V of the motor together at the same time to produce multiple sets of current I, position P and velocity V values;
for each set of current I, position P and velocity V values, compute a corresponding MOP value using at least some of the current I, position P and velocity V values;
build the multi-dimensional MOP model for the motion system using the position P, velocity V and corresponding MOP values, the multi-dimensional MOP model being a multi-dimensional model in space defined by at least the position P, velocity V and corresponding MOP values;
after the multi-dimensional MOP model has been built, collect motion variables that are used by the servo drive to drive the motor of the motion system in response to motion commands, the motion variables including an actual current I to drive the motor, an actual position P of the motor and an actual velocity V of the motor;
calculate a health indication value for the motion system using the collected motion variables, including computing an actual MOP value using at least some of the actual current I, the actual position P of the motor and the actual velocity V of the motor, and taking a difference between the actual MOP value and a MOP value from the multi-dimensional MOP model to derive a MOP deviation value that is used to calculate the health indication value; and
in response to the health indication value, generate a notification for maintenance of the motion system.

11. The motion system of claim 10, wherein the at least one processor is configured to build a three-dimensional MOP model for the motion system using the position P, velocity V and corresponding MOP values, the corresponding MOP values including torque, vibration, current noise or friction values associated with the motion system, each of these corresponding MOP values being a function of the position P and velocity V values.

12. The motion system of claim 10, wherein the at least one processor is configured to build a four-dimensional MOP model for the motion system using motion system inertia values in addition to the position P, velocity V and corresponding MOP values, the corresponding MOP values including torque, vibration, current noise or friction values associated with the motion system, each of these corresponding MOP values being a function of the position P, velocity V and motion system inertia values.

13. The motion system of claim 10, wherein the position P value is defined by X position, Y position and Z position values, and wherein the at least one processor is configured to build the multi-dimensional MOP model for the motion system using the X position, Y position and Z position values.

14. The motion system of claim 13, wherein the at least one processor is configured to build a six-dimensional MOP model for the motion system using motion system inertia values in addition to the X position, Y position, Z position, velocity V and corresponding MOP values, the corresponding MOP values including torque, vibration, current noise or friction values associated with the motion system, each of these corresponding MOP values being a function of the X position, Y position, Z position, velocity V and motion system inertia values.

15. The motion system of claim 10, wherein the at least one processor is configured to use fast-Fourier transform analysis on the current I values or the velocity V values to derive the corresponding MOP value.

16. The motion system of claim 10, wherein the at least one processor is configured to calculate another health indication value, wherein the another health indication value is a friction coefficient value that is computed using only the collected motion variables used by the servo drive.

17. The motion system of claim 16, wherein the friction coefficient value is a viscous friction coefficient value or a Coulomb friction coefficient value.

18. The motion system of claim 10, wherein the at least one processor is configured to calculate another health indication value, wherein the another health indication value is a total impact value that is computed using magnitudes of changes in acceleration based on the collected motion variables.

* * * * *